United States Patent
Fishteyn

(10) Patent No.: US 7,209,615 B2
(45) Date of Patent: Apr. 24, 2007

(54) ETCHED TAPERED FIBER BUNDLE AND METHOD OF MAKING THE SAME

(75) Inventor: Michael Fishteyn, Bridgewater, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 280 days.

(21) Appl. No.: 10/980,942

(22) Filed: Nov. 4, 2004

(65) Prior Publication Data

US 2006/0093290 A1  May 4, 2006

(51) Int. Cl.
*G02B 6/04* (2006.01)
*G02B 6/255* (2006.01)

(52) U.S. Cl. .......................................... 385/115; 65/409
(58) Field of Classification Search ................ 385/115; 65/409
See application file for complete search history.

(56) References Cited

U.S. PATENT DOCUMENTS

| | | |
|---|---|---|
| 5,864,644 A | 1/1999 | DiGiovanni et al. |
| 5,935,288 A | 8/1999 | DiGiovanni et al. |
| 6,061,490 A | 5/2000 | Sera et al. |
| 6,324,326 B1 | 11/2001 | Dejneka et al. |
| 6,397,636 B1 | 6/2002 | DiGiovanni et al. |
| 2002/0054740 A1 | 5/2002 | Vakili et al. |

*Primary Examiner*—Frank G. Font
*Assistant Examiner*—Mary El-Shammaa

(57) ABSTRACT

A tapered fiber bundle is formed by first etching the end portions of each fiber within the group so as to remove a selected amount of outer cladding material from each fiber. The assembled, etched fibers are then fused together in conventional fashion to form a fiber bundle. By first etching the fibers to form a "tapered" structure, the core diameter of the tapered fiber bundle remains intact; in the prior art, the tapering process of drawing down the fused collection of fibers would reduce the core diameter. Preferably, the outer cladding of the central single mode fiber is modified to exhibit the same etch rate as the outer cladding layer of the remaining fibers.

8 Claims, 2 Drawing Sheets

ETCHED TAPERED FIBER BUNDLE AND METHOD OF MAKING THE SAME

TECHNICAL FIELD

The present invention relates to the creation of fiber optic bundles and, more particularly, to the utilization of an etching process to preserve the diameter of the central core fiber during the tapering process.

BACKGROUND OF THE INVENTION

Fiber optic bundles are used in a wide variety of optical applications, including optical fiber amplifiers, couplers, splitters and cladding-pumped lasers. In an exemplary application, a fiber bundle is used to couple light from a multiplicity of laser diode light sources to the inner cladding of a double-clad fiber device. The fiber bundle is typically made by fusing together the individual fibers. The bundle may then be tapered, again using a heat treatment, to provide increased light intensity.

To date, the conventional tapered fiber bundles formed using the "fuse and taper" process have at least one serious drawback: the act of tapering decreases the diameter of the central core fiber. As a result, it creates a mismatch in core diameters between the central core of the fiber bundle and the core of the communication fiber (e.g., fiber amplifier) in the device to which the bundle is coupled.

In some cases, when using standard single mode fibers, this problem may be addressed by SMT-type fibers as the central fiber of the tapered fiber bundle. In particular, an SMT fiber comprises a core sitting on a pedestal, where the geometries of the core and pedestal are configured so that when such a fiber is tapered down to a certain diameter, the mode field becomes the same as for an untapered fiber. Alternatively, various types of in-line lensing arrangements may be inserted between the fiber bundle and the communication fiber to improve the coupling efficiency. However, this coupling comes at the cost of requiring additional components, cost and assembly, as well as introducing losses/reflections at the various interfaces between components.

Thus, a need remains in the art for an arrangement utilizing tapered fiber bundles that allows for a conventional core-to-core coupling between the core of the fiber bundle and the core of the communication fiber.

SUMMARY OF THE INVENTION

The need remaining in the prior art is addressed by the present invention, which relates to the creation of fiber optic bundles and, more particularly, to the utilization of an etching process to preserve the diameter of the central fiber core during the tapering process.

In accordance with the present invention, a fiber bundle is formed by first collecting the group of fibers, including a central fiber (single mode fiber) surrounded by a plurality of multimode fibers. The fibers are held within a capillary that allows for the ends of the stripped fibers to be exposed. Prior to fusing the fibers together to form a bundle, the exposed ends of the fibers are etched (using an etchant such as HF) to remove a portion of the outer cladding layer of each fiber. Therefore, upon fusing the fibers together, a "taper" will naturally be formed as a result of each fiber having a reduced outer cladding layer.

It is an important aspect of the present invention that the single mode fiber is modified to have an outer cladding layer that is doped to match the doping of the outer cladding layer of the surrounding multimode fibers. By using matching outer cladding layer materials, each fiber will etch at the same rate, allowing for the entire core region of the central single mode fiber to remain intact.

Other and further features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
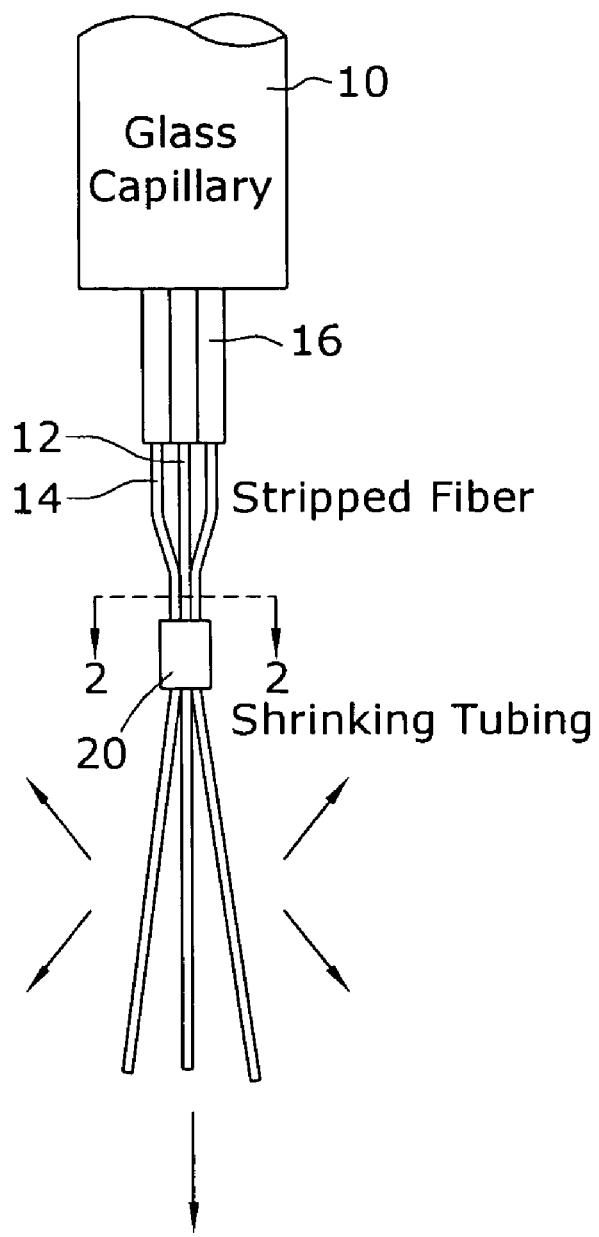
FIG. 1 contains an illustrating of a plurality of fibers, assembled to begin the bundling process.
Figure 2:
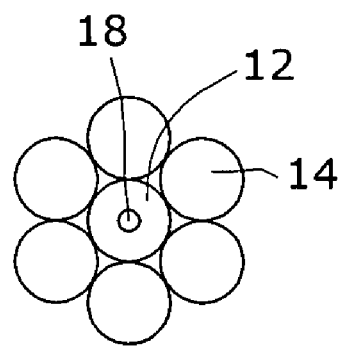
FIG. 2 is a cross-section of an endface of an exemplary fiber bundle, illustrating the location of the central single mode fiber within the bundle.

FIG. 1 illustrates the first step in the fabrication process, where a plurality of separate fibers including a central single mode fiber 12 and a surrounding group of multimode fibers 14 is held within a glass capillary 10. Before further processing occurs, the outer coating layer 16 is stripped from the end of each individual fiber 12 and 14. This stripping process thus leaves the outer cladding layer of each fiber exposed. FIG. 2 is a cross-section view, taken along line 2—2 of FIG. 1, of the plurality of fibers 12, 14. In this view, a core region 18 of central single mode fiber 12 is clearly visible. As discussed above, a problem with many of the conventional prior art tapering processes is that as the taper is formed by heating and drawing the exposed fiber tips, the core region will also decrease in diameter, thereby reducing the coupling efficiency between the tapered fiber bundle and the associated fiber-based device.

In accordance with the present invention, therefore, an etching process is used to individually "taper" each fiber in the bundle by etching away a predetermined portion of the outer cladding layer. Referring to FIG. 1, a holding element, such as a section of shrink tubing 20 is formed around the end of the fiber bundle prior to etching. Shrink tubing 20 functions to squeeze the bare fibers together, thus preserving the close pack arrangement. Advantageously, the use of shrink tubing 20 also provides for fan-out divergence of the end portions of the individual fibers, as indicated by the arrows in FIG. 1, so that each fiber is equally exposed to the etchant solution.

Figure 3:
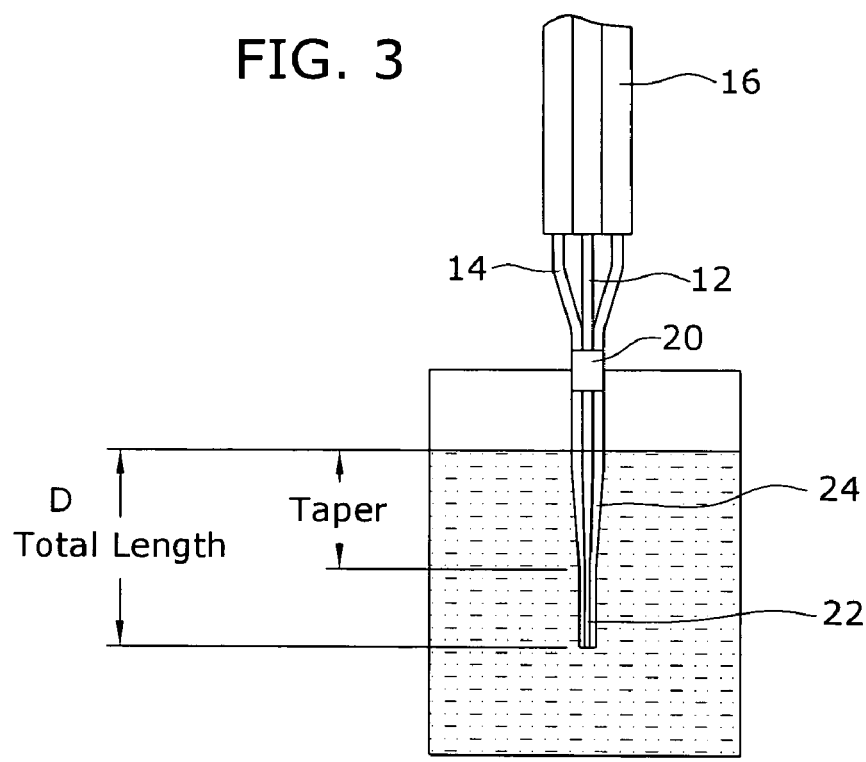
FIG. 3 is a diagram illustrating the etching step of the fabrication process of the present invention, the etching step used to individually "taper" each fiber prior to bundling.

Referring to FIG. 3, the tapered shape is formed by dipping the assembly of FIG. 1 into a suitable liquid etchant solution. A conventional etchant such as HF may be used for this purpose. The depth of immersion D defines the total length of the etched portion, consisting of both the straight termination section (tail) 22 and tapered portion 24. In order to effect the etching process, the bundle is dipped into and out of the solution a number of times, where the dipping rate and depth will define the parameters of the final taper structure (controlled by etch rate and duration).

In order for central single mode fiber 12 to be etched at the same rate as the surrounding multimode fibers 14, single mode fiber 12 must include an outer cladding material with the same properties as multimode fibers 14. In most cases, multimode fibers include a fluorinated outer cladding layer, where single mode fiber 12 would comprise a pure silica cladding region with an "up-doped" core 18. In this case, the differences in glass composition would result in different etch rates, and as a result different final diameters between central single mode fiber and the surrounding fibers.

Therefore, in accordance with an aspect of the present invention, the cladding region of single mode fiber 12 made be modified during the fiber fabrication process to utilize the same outer cladding layer material as the multimode fibers, forming the single mode fiber to have the same outer diameter as the multimode fibers, ensuring the ability to closely pack the fibers together, as shown in the cut-away end view of FIG. 2. The addition of such a cladding layer to single mode fiber 12 does not change the single mode properties of the fiber, but does allow for the same etching process to be used to form the taper.

Figure 4:
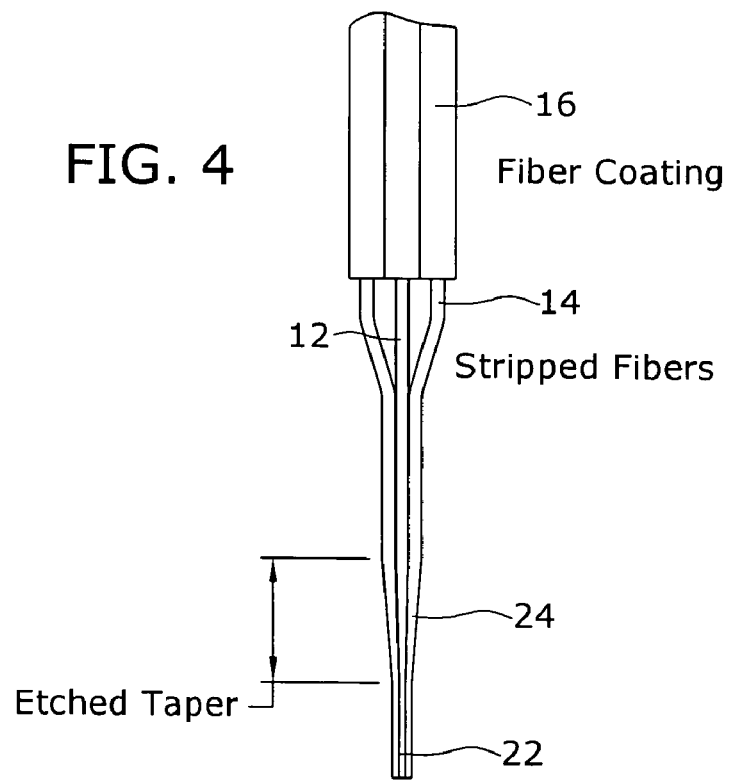
FIG. 4 illustrates an exemplary etched tapered fiber bundle of the present invention.

Once the fibers are etched, a precursor material (such as a colloidal sol) may be applied to the etched end tapers and then dried. The etched fiber terminations are then fused together using a conventional process, such as by passing the bundle of etched fiber terminations through the flame of a gas torch. The finished etched, tapered fiber bundle is then formed, as shown in FIG. 4. Thus, in accordance with the present invention, a tapered fiber bundle is formed where the inner core region 18 of central single mode fiber 12 is maintained at its original diameter, while a tapered structure is formed by removing the outer cladding layer using a separate etching process prior to fusing the fibers together to form a bundle.

It is to be understood that the above-described method and embodiment of the present invention are illustrative of only a few of the many possible specific embodiments that can represent applications of principles of the present invention. Numerous and varied other arrangements, such as other dopants for the cladding of the central single mode fiber, may be made by those skilled in the art without departing from the spirit and scope of the invention.

What is claimed is:

1. A method of forming a fiber bundle from a plurality of separate optical fibers including at least one single mode fiber, the method comprising the steps of:

arranging the plurality of separate fibers into a closely-packed circular assembly, with a single mode fiber at the center of the assembly, the single mode fiber defined as including a central core region and a surrounding cladding region;

stripping all outer coating material from each fiber within the collected, closely-packed circular assembly, so as to expose the outer cladding layer of each fiber;

exposing the stripped collected assembly to an etching material that reacts with the material of the outer cladding layer of each fiber, thus etching away a predetermined portion of the outer cladding layer of each fiber to form a fiber of reduced diameter; and fusing together the etched end portions of the plurality of fibers to form the fiber bundle wherein the reduced diameter of each fiber allows for the fused portion to be tapered with respect to the non-etched portion of the fiber bundle.

2. The method as defined in claim 1 wherein in performing the exposing step, a liquid material is used as the etchant and the plurality of fibers are dipped into the liquid etchant.

3. The method as defined in claim 2 wherein in performing the exposing step, the plurality of fibers are dipped into and out of the liquid etchant at a predetermined rate, so as to form the desired tapered structure.

4. The method as defined in claim 2 wherein the length of the tapered section is defined by the length of fiber immersed into the liquid etchant.

5. The method as defined in claim 2 wherein the liquid etchant comprises HF.

6. The method as defined in claim 1 wherein the central single mode fiber is formed to comprise an outer cladding layer of the same material as the remaining plurality of fibers, thus allowing for the same thickness of cladding material to be removed by etching.

7. The method as defined in claim 6 wherein the single mode fiber and the remaining fibers in the plurality of fiber include a fluorinated cladding layer.

8. The method as defined in claim 1 wherein the central single mode fiber comprises an outer diameter essentially equal to the outer diameter of the remaining fibers within the bundle.

* * * * *